March 29, 1966     P. S. BRITTON ETAL     3,243,328
METHOD OF MAKING SPIRALLY WOUND FLEXIBLE, PLASTIC TUBING
Original Filed Oct. 19, 1960     3 Sheets-Sheet 1

INVENTORS
PHILIP S. BRITTON AND
HELMUT P. FOCHLER
BY
Teare, Tetzer & Teare
ATTORNEYS March 29, 1966  P. S. BRITTON ETAL  3,243,328
METHOD OF MAKING SPIRALLY WOUND FLEXIBLE, PLASTIC TUBING
Original Filed Oct. 19, 1960  3 Sheets-Sheet 3
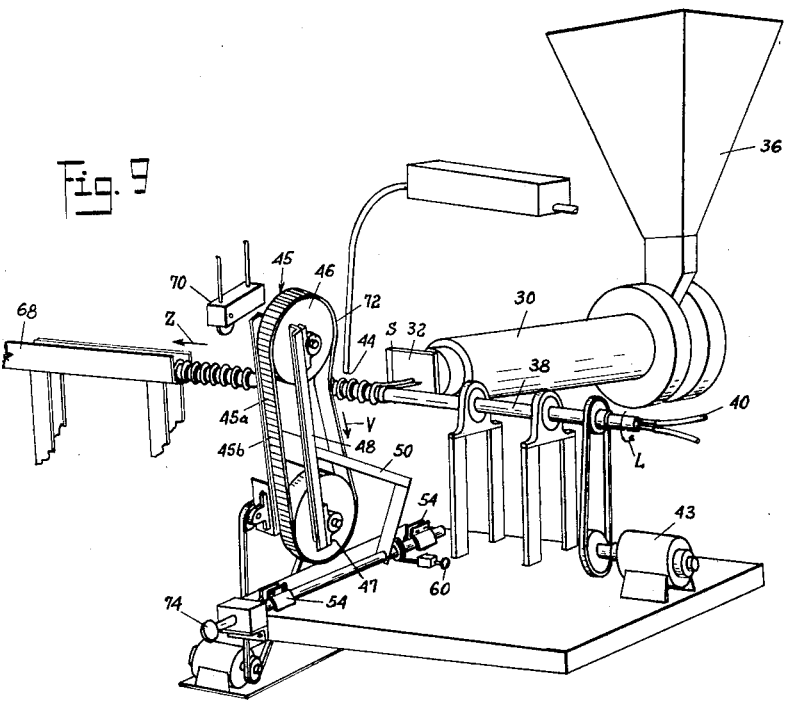
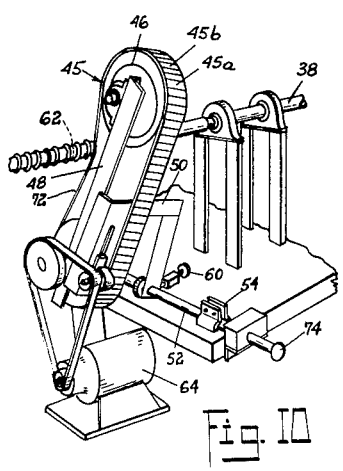
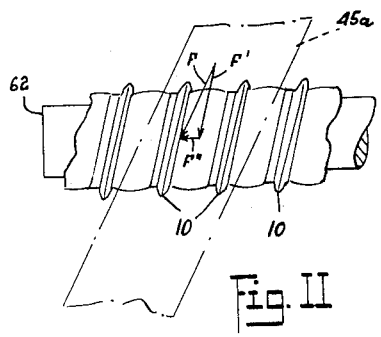
INVENTORS
PHILIP S. BRITTON AND
HELMUT P. FOCHLER
BY
Teare, Fetzer & Teare
ATTORNEYS United States Patent Office 3,243,328
Patented Mar. 29, 1966

3,243,328
METHOD OF MAKING SPIRALLY WOUND
FLEXIBLE, PLASTIC TUBING
Philip S. Britton, Shaker Heights, and Helmut P. Fochler,
Bedford, Ohio, assignors, by mesne assignments, to
Continental Oil Company, a corporation of Delaware
Original application Oct. 19, 1960, Ser. No. 63,595, now
Patent No. 3,122,171, dated Feb. 25, 1964. Divided
and this application Apr. 24, 1962, Ser. No. 189,733
4 Claims. (Cl. 156—195)

This invention relates in general to plastic tubing and more particularly to apparatus and a method for producing high strength, relatively thin walled plastic tubing. This is a divisional application of the pending United States patent application of Philip S. Britton et al., Serial No. 63,595, filed October 19, 1960, now Patent No. 3,122,171.

Plastic tubing is useful for conveying fluids or liquids from one place to another under a great variety of environmental situations. One of such situations is where the tubing is used to convey water from an irrigation ditch to adjacent fields for irrigating the fields. Such tubing heretofore was generally either in the form of a more or less rigid pipe type, or of a flexible pipe type, with any such flexibility of the tubing being generally provided strictly by the elasticity of the material used in forming the tubing. The more or less rigid pipe type, while of generally good strength, including good crush resistance, could not, of course, be oriented after the manufacture thereof to conform to angles and bends about which the tubing passed, and therefore did not always find adequate support for the tubing, unless the tubing was preformed during its manufacture into a particular configuration, the latter limiting its use. The flexible pipe type generally possessed this ability to conform to the contour of supporting surfaces, but it generally did not possess sufficient strength, and especially sufficient crush resistance, due to the elasticity of the material necessary to provide the desired flexibility of the pipe. Moreover, when fluid, such as water, was flowing through the pipe, the ability of the elastic flexible pipe to retain its originally oriented curved or angled configuration diminished, with the pressurized fluid tending to straighten the pipe out and change its positional relation.

The apparatus and method of the present invention provides a generally thin walled tubing or pipe which may possess considerable flexibility, which can be provided in a large range of diameter sizes, which possesses high strength, and especially very good crush-resistant strength, and which has the ability, if possessing flexible characteristics, to generally retain any originally oriented curved or angled configuration while fluid is flowing through the pipe. The method of manufacture and associated apparatus also provides for the formation of a substantially non-flexible, high crush resistant plastic pipe in a novel manner.

Accordingly, an object of the invention is to provide a novel method and apparatus system for the formation of high strength, relatively thin walled plastic tubing.

Another object of the invention is to provide a novel method and a novel apparatus system for the formation of a high strength, relatively thin walled plastic tubing, and wherein the latter possesses considerable flexibility characteristics even though the plastic material of the tubing is of generally non-elastic type.

A still further object of the invention is to provide a novel method for the continuous production of relatively thin walled, high strength plastic tubing including the extrusion of a flanged strip of plastic material having an intermediate rib portion, winding the strip of plastic material in spiral form on a mandrel with adjacent flanges of the strip being disposed in overlapping relation to form the tubing product, and moving the tubing axially of the mandrel away from the extrusion point.

Another object of the invention is to provide a novel apparatus system for the production of relatively thin walled, high strength plastic tubing comprising the oriented disposition of a rotatable mandrel, a plastic extrusion device for extruding a strip of plastic material onto the mandrel, and stripper means for engaging the tubing product and moving it in an axial direction with respect to the mandrel.

Other objects and advantages of the invention will be apparent from the following description taken in conjunction with the accompanying drawings wherein:

FIG. 9 is a generally perspective, more or less diagrammatic illustration of an apparatus for producing the tubing;

FIG. 10 is a fragmentary view of a portion of the apparatus shown in FIG. 9, and more particularly the belt mechanism for moving the tubing off the mandrel, and taken from the opposite side of said mechanism as compared to that illustrated in FIG. 9;

FIG. 11 is a diagrammatic illustartion of the force applied to the tubing by the belt mechanism of FIGS. 9 and 10, to move the tubing product off the mandrel in a continuous operation.

Referring now again to the drawings, and in particular to FIGS. 1 to 4 thereof, there is illustrated a piece of flexible type tubing provided in accordance with the instant invention. The tubing is formed from strip-like material S (FIGS. 2 and 3) spirally wound in overlapped relation with adjacent convolutions of the spirally wound strip., and heat bonded into a finalized tubing product. As can be best seen in FIGS. 2 and 3, the strip-like material S comprises a preferably exterior ridge or rib portion 10 disposed intermediate laterally disposed flange portions 12 and 14.

The strip-like material is preferably formed of a thermo-plastic, such as for instance polyethylene or rubber modified styrene, having more or less non-elastic properties. The polyethylene may range from a low density type to a high density type, and the plastic material may also be formed of a mixture of polyethylene and other polymeric materials, such as polyisobutylene. Plasticized polyvinyl chloride may also be utilized.

The thickened rib portion 10 provides for considerable strengthening of the finalized tubing product, since as can be seen from FIGS. 1 to 4, such substantially rigid rib portion extends radially a substantial amount in spirally wound or helically extending relation about the exterior of the tubing, thereby providing considerable crush resistant strength to the finalized tubing product.

Figure 1:
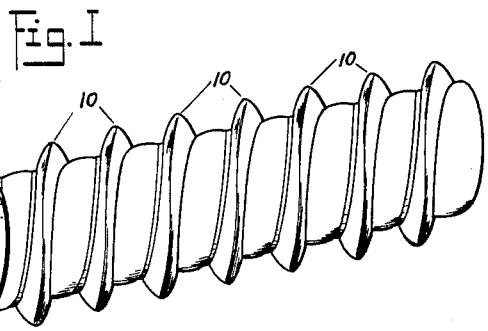
FIG. 1 is a generally perspective view of a plastic tubing product constructed in accordance with the method and apparatus system of the instant invention.
Figure 3:
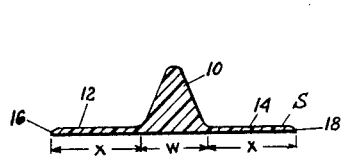
FIG. 3 is an enlarged, sectional view, taken substantially along the plane of line 3—3 of FIG. 2, looking in the direction of the arrows, and showing positional and general size relationships of the ridge portion of the strip material with respect to the lateral flange portions thereof.
Figure 2:
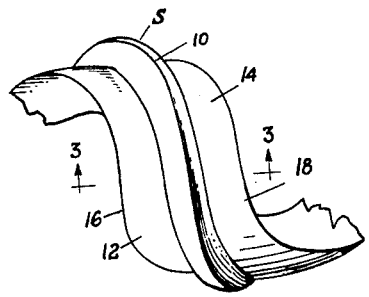
FIG. 2 is an enlarged, fragmentary view of a strip of plastic material used to form the spirally wound, finalized tubing product of FIG. 1.
Figure 4:
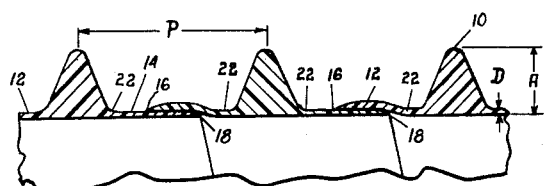
FIG. 4 is a fragmentary sectional view of one form of the generally flexible, plastic tubing product formed with the method and apparatus system of the instant invention and utilizing the strip material of FIGS. 2 and 3.

Referring now in particular to FIG. 4, in accordance with the invention, in order to provide generally flexible characteristics to the finalized tubing product, the strip S of generally non-elastic material is spirally wound and secured in overlapping relation with the adjacent convolutions of the strip, so that the outer boundary edges 16 and 18 of flanges 12 and 14 respectively of one convolution are disposed in longitudinally spaced (or axially spaced with regard to the finalized tubing product) relation to the respective rib portion 10 of the adjacent convolutions of the tubing, and so on along the tubing for the full length thereof.

Figure 6:
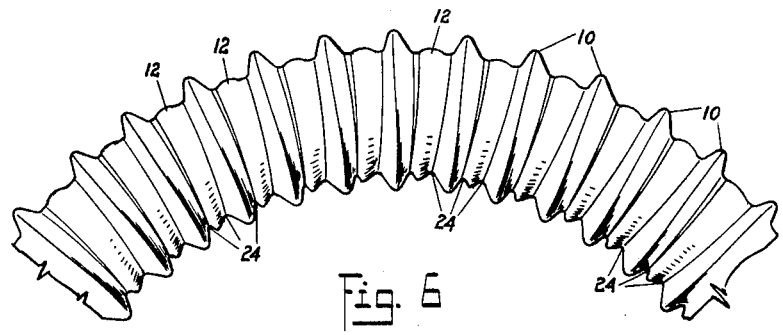
FIG. 6 is a fragmentary, elevational view of a piece of the flexible type tubing as oriented in a curved configuration, and illustrating the flexure or creasing of sections of the flange portions of the wound strip material forming the tubing.
Figure 7:
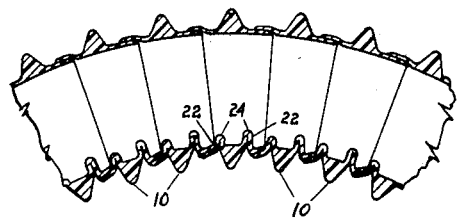
FIG. 7 is a fragmentary sectional view illustrating the creasing of the flange portions in the bent tubing of FIG. 6.

It will be seen therefore that with such an arrangement, a thicker dimension of the wall of the tubing through a portion of the longitudinal dimension between adjacent rib portions of the tubing is provided, together with relatively thinner wall portions of the tubing. Thus when the tubing is bent to conform the same to a curved or angular contour, the relatively thin wall sections 22 of the flange portions 12 and 14 on the underside (FIGS. 6 and 7), or minimum radius bend of the tubing, fold or crease inwardly as shown at 24 in FIG. 7, to provide considerable flexibility characteristics to the high strength tubing.

Referring now again to FIG. 4, it has been determined that the pitch distance P, or in other words the distance between the centers of adjacent rib portions of the convolutions of the tubing, should be at least 1.7 times the width distance X of one of the flanges of the tubing and preferably in the range of 1.7 to 2 times the distance X, in order to provide the flexibility and high strength characteristics to the tubing. In this connection, the width X of each of the flange portions 12 or 14 of the strip material is in the general range of 1.3 to 2 times the maximum width W (FIG. 3) of the rib portion 10 of the strip. When such pitch distance P is less than the aforementioned 1.7 times the width distance X, the tubing has very little if any flexible characteristics, and may be classified as more or less of an inflexible high strength type tubing. Thus it will be understood that providing the tubing product with predetermined size or extent of relatively thinner wall sections between the helically extending rib portions 10 provides a product of high strength characteristics, but one which has flexibility, whereby the tubing can be bent or deformed into an arcuate contour, for ready use of the tubing around curved support surfaces.

Referring again to FIG. 4, the thickness D of the flange portions 12 and 14 will effect the flexibility of the tubing since if D is increased the flexibility will tend to decrease, but for the relatively thin walled tubing with which the present invention is concerned, such tubing having an internal diameter of at least thirty times the dimension D, any variance of D within the range of relevancy specified between the internal diameter of the tubing product and the dimension D will have relatively little effect on flexibility.

The following list is given for the aforementioned dimensions P, X, W, and D for various internal diameter sizes of tubing product produced in accordance with the method and apparatus of the invention. These sizes of tubing are adapted for use as siphon tubes in the afore- mentioned irrigation environment. There is also listed a dimension A (FIG. 4) which indicates the preferred height of the rib portion 10 of the strip material for the tubing sizes listed. It will be noted that the various sizes of tubing are grouped in two columns, with the left hand column designating tubing having flexible characteristics, or in other words wherein the distance P equals at least 1.7 times the distance X, and with the right hand column designating tubing having non-flexible characteristics, or in other words wherein the distance P is less than the aforementioned 1.7 times the distance X.

| Flexible | | Non-Flexible | |
|---|---|---|---|
| 1″ tubes | P .735 inch<br>X .383<br>W .235<br>D .030<br>A .312 | 1″ tubes | P .485 to .610 inch<br>X .383<br>W .235<br>D .030<br>A .312 |
| 1¼″ tubes | P .700<br>X .275<br>W .200<br>D .030<br>A .210 | 1¼″ tubes | P .450<br>X .275<br>W .200<br>D .030<br>A .210 |
| 1½″ tubes | P .715<br>X .393<br>W .215<br>D .025<br>A .275 | 1½″ tubes | P .465 to .590<br>X .393<br>W .215<br>D .025<br>A .275 |
| 2″ tubes | P1 .010<br>X .495<br>W .260<br>D .025<br>A .200 | 2″ tubes | P .635<br>X .495<br>W .260<br>D .025<br>A .200 |

It will be understood that the above are illustrative only and so long as the minimum ranges of aforedescribed relationships are maintained, a novel tubing product will be produced in accordance with the instant invention.

Figure 8:
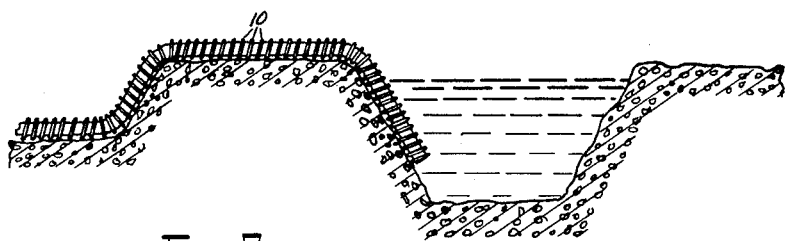
FIG. 8 is a diagrammatic illustration of an environmental use of the flexible type tubing showing the tubing being utilized to convey water from an irrigation ditch to adjacent cultivated ground, for irrigation purposes.

Referring now to FIG. 8, it will be seen that the flexible type tubing is ideally suited for conforming to the contour of a supporting surface, such as the banks of the irrigation ditch illustrated, and readily adapts itself to many environmental uses where it is desirable to have a relatively thin walled high strength plastic tubing for carrying fluid, and where it is desirable to conform the tubing to a supporting surface, and assuring retention of the tubing in whatever position placed.

Figure 5:
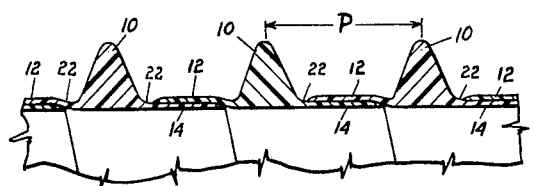
FIG. 5 is a view generally similar to that of FIG. 4, but illustrating a modified form of the tubing, which modified form is of a generally non-flexible type.

Referring now to FIG. 5, there is shown a modified form of the tubing in which the spirally wound convolutions of the strip-like material forming the tubing product are wound closer together as compared with that of FIG. 4, whereby the end boundaries of flanges 12 and 14 on the convolutions are disposed closer to the adjacent ridge or rib portion of the adjacent convolution. It will be seen that such an arrangement decreases the longitudinal or axial dimensions of the thinner wall sections 22 of the tubing, and leaves a lesser amount of such thinner wall portions for inward folding or creasing upon bending of the tubing. Thus such a tubing product has very little if any flexibility since such reduced size or extent of thinner wall sections are not sufficient to provide for any creasing of the tubing product in the manner aforedescribed. In this connection the pitch distance P between adjacent rib portions 10 of the tubing is less than the aforementioned 1.7 times the width distance X of the flange portions of the strip material of the tubing, and as aforementioned and as indicated in the right hand column of the above exemplary list, results in a substantially non-flexible tubing product. However such tubing has great strength characteristics and especially very good crush resistance.

Referring now to FIG. 9, there is illustrated one form of apparatus arrangement which may be utilized to produce both the aforementioned flexible and generally non-flexible tubing products. Such apparatus comprises an extruder 30 of conventional well known type having an extruding head 32 thereon. The plastic raw material, such as polyethylene, is deposited in the hopper 36 of the extruding machine and is extruded out of the head portion 32 in heated condition, to be spirally wound upon rotating mandrel 38. Mandrel 38 is preferably hollow and may be internally cooled as by means of the pressurized water duct 40 extending into one thereof. As the hot strip-like material S is wound upon the mandrel, the adjacent convolutions are heat-bonded together due to the residual heat of the plastic material, after which a cooling fluid is applied thereto, as at 44, to cool the tubing product sufficiently for further operations thereon. The mandrel driven by preferably adjustable speed motor 43, is rotating in the direction of the arrow L illustrated in FIG. 9 and there is provided a stripper mechanism 45 for moving the spirally wound tubing product axially of and off of the mandrel. Such mechanism comprises an endless belt 45a formed of rubber or the like, the outer surface of which is roughened as at 45b and as illustrated, and with such belt being mounted upon spaced rotatable drums 46, 47 which are connected by support means 48. Belt 45a is adapted to move in the direction of arrow V. Support means 48 is mounted as by means of structure 50 on a shaft 52 which is mounted in support brackets 54. Shaft 52 is movable or rotatably adjustable with respect to the support brackets 54 so that angular relationship between the belt of the tubing stripping mechanism 45 and the tubing product can be selectively changed, as for instance by actuating handle mechanism 60. This angular relationship of the movable belt 45a with respect to the tubing product is such that the belt engaging the tubing product on the mandrel urges it off the end 62 of the mandrel during rotation of the latter, and in the direction of the arrow Z illustrated in FIG. 9. Thus the tubing product is continually being formed during rotation of the mandrel and is continually being urged or moved off the mandrel by means of the belt mechanism 45. By adjusting the speed of the mechanism 45. By adjusting the speed of the machanism 45, the pitch distance P between adjacent ridge portions of the tubing product can be varied, thereby providing for producing either a generally flexible tubing product or a generally non-flexible tubing product, depending upon the aforedescribed relationship between the pitch distance P and the flange width X. Means is provided for the motor 64 (FIG. 10) which drives the belt of mechanism 45, for changing the speed of the motor and therefore the speed of the belt, and thus varying the pitch distance as aforementioned. As the tubing product is moved off of the mandrel, it may move along receiving trough 68 until the desired length of tubing product is produced, after which it can be severed by any suitable means, such as the preferably automatically actuated cutter 70, from the continually produced tubing on the mandrel. The driving stretch 72 of belt 45a preferably engages the tubing on mandrel 38 just below the upper drum 46 and in a partial wrap around relationship, thereby increasing the surface engagement between stretch 72 of the belt and the periphery of the tubing. Means 74 may also be provided for moving the stripper mechanism 45 transversely with respect to the tubing, thereby providing for adjustment of the belt tension in its engagement with the tubing, and providing for the use of the mechanism with different sizes of mandrels in the production of different diameters of tubing product.

While only one extrusion machine and on mandrel 38 has been illustrated in the drawings, it will be understood that a plurality of extrusion heads and associated mandrels could be provided, all of which could be engageable with the belt 45a of the mechanism 45 to greatly increase the production of the apparatus. It will also be understood that while the mandrel 38 has been shown disposed in a horizontal position with the belt of the stripper mechanism 45 disposed in a generally vertical position, the mandrels could be disposed in a more or less vertical position and the belt disposed in a generally horizontally moving position, thereby providing more space for a plurality or gang of mandrels.

Referring now to FIG. 11, there is diagrammatically illustrated the relationship between the movable belt 45a of the tubing stripping mechanism 45 and the helically extending rib portions 10 on the tubing product. It will be seen that a major portion F' of the force F applied by the movable belt 45a to the tubing product is applied generally parallel to the angle of inclination of the rib portions of the convolutions of the product, while a portion F" of the force F is applied in a generally axial direction with respect to the tubing product, thereby moving the tubing product axially of and off of the mandrel. It will be seen that if the speed of the belt is increased with respect to the speed of the mandrel, the greater portion of the increased force of the belt is applied parallel to the direction of inclination of the rib portions 10 of the tubing product, thereby increasing the rotary speed of the tubing product and with respect to the mandrel, and causing the pitch distance P between adjacent rib portions of the tubing product to decrease. The lubricating characteristics or low coefficent of friction of the aforementioned plastic materials, such as polyethylene, provides for comparatively ready relative movement between the tubing and the mandrel. In actual practice, the speed of the belt is preferably approximately the speed of the rotating mandrel 38. The cooling of the heated product after it has been spirally wound on the rotating mandrel is so arranged that while the adjacent convolutions are heat bonded to one another, they are in a sufficiently stable condition by the time they reach the movable belt 45a that they will not be deformed or injured by the movable belt. After the tubing product is received in the trough 62, it can be further cooled since it is still in a somewhat heated although very stable condition. This cooling can be accomplished either by air cooling or by subjecting the tubing product to a water spray or water bath or the like.

From the foregoing discussion and accompanying drawings it will be seen that the invention provides a novel method and apparatus system for the production of a plastic tubing product for use in a variety of environmental settings, with such tubing product being formed from relatively inexpensive thermoplastic material, and which may still possess considerable flexible characteristics including the ability to retain a curved or angled orientation thereof even though liquid is flowing through the tubing, and by so arranging the pitch distance between adjacent rib portions of the tubing, the flexibility characteristics of the tubing can be varied. Moreover, it will be seen that the invention provides a novel method and apparatus system for producing a high strength flexible tubing product formed of generally non-elastic plastic material and including wall structure comprising generally helically extending rib or ridge portions with flanged portions disposed intermediate the rib portions to define the wall structure of the tubing, and with such flange portions having generally spirally extending sections of lesser thickness than the remainder of the respective flange portion.

The terms and expressions which have been used are used as terms of description and not of limitation, and there is no intention in the use of such terms and expressions of excluding any equivalents of the invention shown or described, or portions thereof, but it is recognized that various modifications are possible within the scope of the invention claimed.

We claim:

1. In a process for the continuous production of a relatively thin walled, high strength plastic tubing product comprising, continuously extruding from a stationary extruder a hot plastic material of generally non-elastic type into strip form, with said strip of material comprising laterally disposed flanges and an intermediate rib portion, winding said strip of hot plastic material in spiral form on a mandrel directly from the extruder by rotating said mandrel, to cause said flanges to be disposed in lapped, heat-bonded secured relation with the flanges of adjacent convolutions of the spirally wound strip of material while applying external rotational pressure at an angle to the tubing product at a point distant from the point of extrusion to move the tubing axially of the mandrel away from the point of extrusion at a speed different from the speed imparted to the movement of the tubing product by rotation of the mandrel, thereby to control the distance between the centers of adjacent rib portions and the amount of overlap of the flanges as the strip is extruded onto the mandrel in said bonded relation so as to vary the flexibility of the tubing product.

2. In a process in accordance with claim 1, including the step of fluid cooling the tubing product between the point of extrusion and the point of application of the external rotational pressure so as to harden the tubing product before it reaches the point of application of pressure by an amount sufficient to prevent damage to the tubing product adjacent the point of application of pressure.

3. In a process in accordance with claim 1, wherein the external rotational pressure contacts at any given moment only a given portion of one side only of the adjacent circumference of the tubing.

4. In a process in accordance with claim 1, wherein the axial speed of the tubing at the point of extrusion, and the said distance between the centers of adjacent rib portions is selectively varied by coordinating the speed of rotation of said rotational pressure with the speed of rotation of said mandrel.

References Cited by the Examiner
UNITED STATES PATENTS

| | | | |
|---|---|---|---|
| 1,944,970 | 1/1934 | Dieffenbach | 156—195 |
| 2,516,864 | 8/1950 | Gilmore et al. | 156—143 |
| 2,661,025 | 12/1953 | Brace | 156—244 XR |
| 2,731,040 | 1/1956 | Warburton | 156—244 |
| 2,748,805 | 6/1956 | Winstead | 156—195 XR |
| 2,748,831 | 6/1956 | Nash | 156—425 |
| 2,828,239 | 3/1958 | Fischer | 156—195 |
| 2,994,104 | 8/1961 | Mittag | 156—195 |
| 3,068,934 | 12/1962 | Mauck et al. | 156—425 |

EARL M. BERGERT, *Primary Examiner.*